United States Patent [19]

Cress

[11] 4,184,067
[45] Jan. 15, 1980

[54] HEAT CONTROL APPARATUS

[76] Inventor: Steven B. Cress, 1330 Desert Willow La., Diamond Bar, Calif. 91765

[21] Appl. No.: 792,501

[22] Filed: May 2, 1977

[51] Int. Cl.$^2$ .................................................. H05B 1/02
[52] U.S. Cl. ................................... 219/490; 236/46 F; 219/493; 219/494
[58] Field of Search ............... 219/490, 493, 491, 497, 219/492, 494; 236/15 BG, 46 R, 46 F

[56] References Cited

U.S. PATENT DOCUMENTS

| | | | |
|---|---|---|---|
| 1,861,288 | 5/1932 | Weill | 219/492 |
| 2,387,562 | 10/1945 | Brunot | 236/15 BG |
| 3,315,891 | 4/1967 | Allen | 219/492 |
| 3,599,864 | 8/1971 | Liddle | 219/492 |
| 3,625,476 | 12/1971 | Meier | 236/46 F |
| 3,814,902 | 6/1974 | Fann | 219/492 |
| 3,855,452 | 12/1974 | Flasza et al. | 219/486 |

OTHER PUBLICATIONS

Robertshaw Controls Co. Model INF, 1-12-1960, Exhibit B.

*Primary Examiner*—Bruce A. Reynolds
*Assistant Examiner*—M. Paschall
*Attorney, Agent, or Firm*—Schuyler, Birch, McKie & Beckett

[57] ABSTRACT

An automatic heat control apparatus for use with an electric heating element in a kiln or the like comprises a first power controller having a plurality of on and off intervals. The first controller supplies electric current to the kiln heating element during its on intervals, and further includes means for adjusting the duration of the on intervals relative to the off intervals. A constant speed electric motor is mechanically coupled to the first power controller for gradually increasing the duration of the on intervals and decreasing the duration of the off intervals; such control ensures that the temperature inside the kiln increases very gradually to lessen the risk of breaking the ceramic material being fired. Furthermore, the average speed of the motor may be controlled by means of a second power controller, similar to the first controller, having a plurality of on and off intervals which intermittently energize the motor for rotation thereof. By adjusting the duration of the on interval relative to the off intervals of the second controller, the average speed of rotation of the motor may be selectively varied to control the rate of increase in the duration of the on interval in the first controller.

13 Claims, 2 Drawing Figures

HEAT CONTROL APPARATUS

BACKGROUND OF THE INVENTION

1. Field of the Invention

The present invention relates generally to an apparatus for controlling the electric current supplied to a heating element and, more particularly, to such an apparatus for use in an electric kiln adapted to fire ceramic ware.

2. Description of the Prior Art

There has recently been a substantial increase in popularity in the home manufacture, either as a hobby or in a small home business, of heat fired ceramic ware. Consequently, a large market has developed for the sale of electric furnaces and kilns to the ceramic hobbyist and the like. One problem often associated with the use of such kilns is that the ceramic materials customarily used have a high thermal shock intolerance at low temperatures. Thus, the temperature in the kiln must be very gradually increased or the ceramic material being fired will fracture. This has often required that the operator be close to the kiln over the entire heating cycle so that he could manually increase the temperature at a gradual rate. The inconvenience to the operator associated with such a procedure is apparent.

Several devices have been proposed in the past to automatically increase the temperature in the kiln at a gradual rate to relieve the operator of the need to manually attend to the kiln. In general, however, such devices utilize relatively expensive electronic or mechanical components which make their price prohibitively high for home use. For example, U.S. Pat. Nos. 3,814,902 to Fann and 3,315,891 to Allen disclose heat control devices comprising a periodic on-off controller which supplies current to the heating element of the kiln. A thermocouple for sensing the temperature inside the kiln is connected to the controller. Both Allen and Fann supra, utilize additional complex circuitry which produces a signal that is combined with that of the thermocouple to fool the controller into sensing an initial temperature in the kiln that is higher than the actual temperature so that the controller does not provide a high heat output at the beginning of the heating cycle. Gradually the additional signal produced by the circuitry diminishes to zero to provide a gradual increase in the temperature in the kiln. A disadvantage of these devices is the need for relatively expensive timing circuits, variable potentiometers and other electrical elements.

U.S. Pat. No. 3,855,452 to Flasza et al discloses another control system for a ceramic kiln which again utilizes quite expensive solid-state timing circuits and logic blocks. Moreover, the use of such solid-state circuits in a control system mounted on or near a ceramic kiln is disadvantageous since such circuits are temperature sensitive and may degrade under the operating temperatures achieved by the kiln. U.S. Pat. No. 1,861,472 to Glitzke discloses a device for gradually increasing the temperature in a furnace comprising a clock motor which progressively cuts out sections of a variable resistance element to thereby increase the electric current being supplied to the heating element. However, such a variable resistance element is often expensive and prone to failure.

SUMMARY OF THE INVENTION

Accordingly, it is an object of the present invention to provide a heat control apparatus for gradually increasing the temperature in a kiln or the like which is reliable and extremely low cost, and thus suitable for home use.

This and other objects of the present invention are accomplished by providing an improved heat control apparatus for use with an electric heating element. The heat control apparatus comprises a first power controller having a plurality of heating cycles. Each heating cycle comprises an on interval during which the first controller supplies electric current to the heating element and an off interval during which the first controller supplies no current to the heating element. In addition, the first controller has a means for adjusting the duration of the on interval relative to the off interval. Motor means are included for automatically actuating the adjusting means over a predetermined time period to gradually increase the duration of the on interval and decrease the duration of the off interval to control the rate of temperature increase of the heating element.

BRIEF DESCRIPTION OF THE DRAWINGS

The novel features of the invention are set out with particularlity in the appended claims, but the invention will be understood more fully and clearly from the following detailed description of preferred embodiments of the invention as set forth in the accompanying drawings, in which:

DESCRIPTION OF PREFERRED EMBODIMENTS

Figure 1:
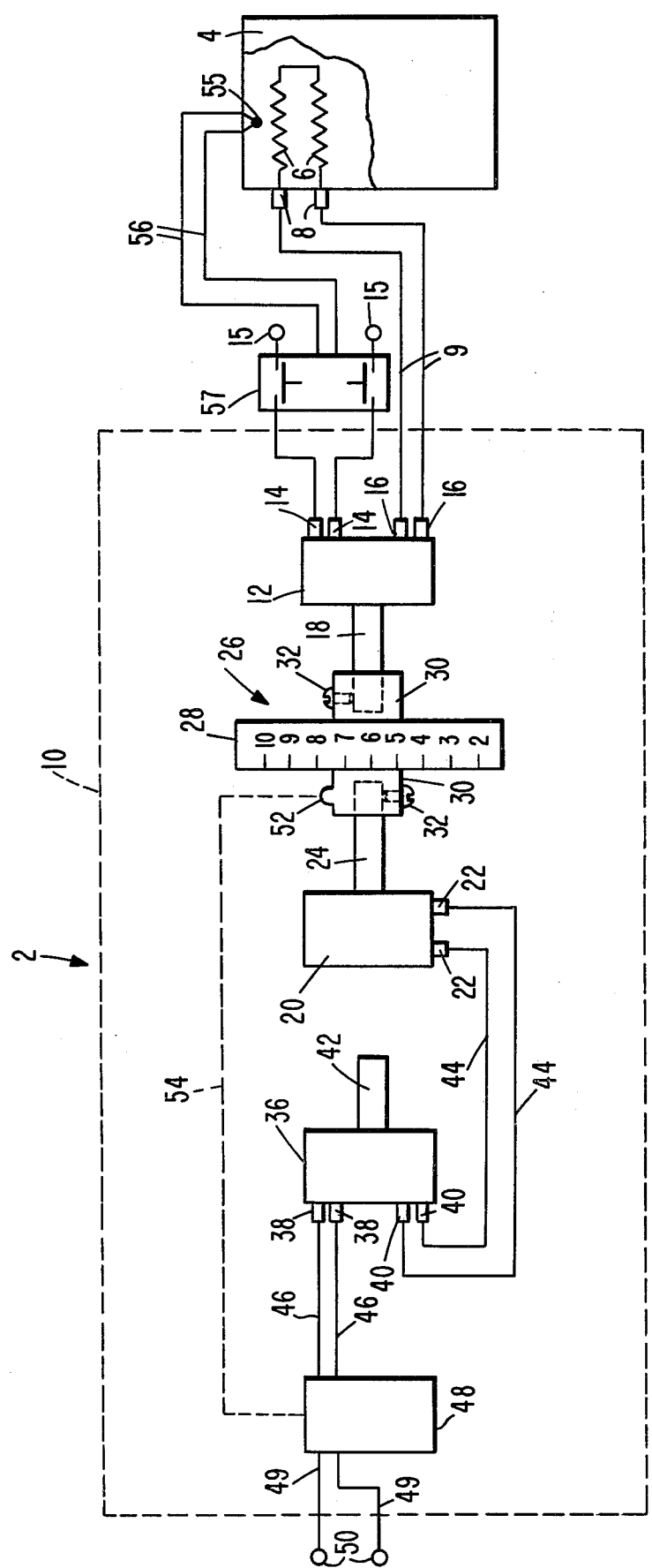
FIG. 1 is a diagrammatic view of a first embodiment of an automatic heat control apparatus according to the present invention.

An automatic kiln heat control apparatus or unit 2 according to a first embodiment of the present invention is diagrammatically illustrated in FIG. 1. Control unit 2 suitably supplies electric current to a conventional electric kiln or furnace 4 having electrical resistance heating elements 6 ending in terminals 8 which are connected by conductors 9 to control unit 2. Control unit 2 is particularly adapted for use with kilns 4 meant for home use by a hobbyist or in a small business. However, unit 2 is not limited for use with such kilns, but may be used to control the rate of temperature increase in any type of electric heating element.

Control unit 2 comprises a suitably shaped housing or enclosure 10 which contains therein the various elements of unit 2. Control unit 2 further includes a first power controller 12 of the periodic on-off type. Controller 12 has input terminals 14 connected to the terminals 15 of an AC voltage source, and output terminals 16 connected to the kiln heating elements 6 by conductors 9. In addition, controller 12 has a rotatable adjusting shaft 18 for changing the duration of the on interval relative to the off interval in controller 12 as described hereafter.

Controller 12 is preferably a Robertshaw Infinite Control, Models Nos. INF24031B, INF12032B or their equivalent. Basically, these power controllers have a plurality of cycles each comprising an on interval during which the controller passes current through the unit to its output terminals and an off interval during which no current is allowed to pass through the unit. Such controllers mechanically comprise a bimetallic control arm having a heater wrapped therearound which is energized whenever power passes through the unit during the on interval. A magnet normally holds the control arm in engagement with an electrical contact allowing the current to pass through the unit from the voltage source to the output terminals. However, as the heater heats the bimetallic control arm during the on interval, the control arm will begin to flex and build up forces which finally overcome the pull of the magnet causing the control arm to break the contact and present the passage of current through the unit. Thus, the unit moves into its off interval until such time as the bimetallic control arm cools and the magnetic pull is reasserted thereon to reestablish contact and begin the next on interval. Shaft 18 of controller 12 has a cam engagement with the bimetallic control arm for changing the unbiased position of such control arm relative to the contact to thereby adjust the duration of the on and off intervals relative to one another.

Control unit 2 further comprises a continuous speed AC electric timing motor 20 having terminals 22 for connection to a power source and a rotatable output shaft 24. Motor 20 and controller 12 are suitably supported and arranged inside enclosure 10 so that output shaft 24 and adjusting shaft 18 are oriented towards one another and spaced a suitable distance apart. An integrally molded thumbwheel 26 having a circular wheel portion 28 and two hollow sleeves 30 extending from either side thereof is rotatably supported inside enclosure 10 and is arranged between motor 20 and controller 12. Adjusting shaft 18 is inserted into one of the hollow sleeves 30 and secured thereto by a setscrew 32 contacting a flat portion on shaft 18. Similarly, output shaft 24 is inserted into the other hollow sleeve 30 and secured thereto by a setscrew 32. The outer surface of wheel portion 28 of thumbwheel 26 suitably extends through the surface of enclosure 10 and has appropriate indicia printed thereon to visually indicate to the operator the level of heating taking place in kiln 4. Moreover, since thumbwheel 26 extends through the surface of enclosure 10, it may be manually rotated by the operator to override the control unit 2 as will be explained in more detail hereafter.

A second power controller 36 having input terminals 38, output terminals 40 and a rotatable adjusting shaft 42 is supported inside enclosure 10 with shaft 42 protruding to the outside of enclosure 10 where it may be manually rotated. Controller 36 is a periodic on-off controller of the same type as controller 12. Output terminals 40 of controller 36 are connected by conductors 44 to terminals 22 of motor 20. In addition, input terminals 38 of controller 36 are connected by conductors 46 to a limit switch 48. Limit switch 48 is connected by conductors 49 to the terminals 50 of a conventional AC power source. Power source 50 may be the same source as power source 15 or it may be a different source as illustrated herein. In any event, sources 15 and 50 comprise conventional 110 VAC or 220 VAC house current.

A cam 52 is integrally formed on the outer surface of one of the hollow sleeves 30 of thumbwheel 26. Cam 52 has a mechanical connection 54 with limit switch 48 for controlling the application of power to controller 36 as will be described hereafter. Although cam 52 and switch 48 have been shown in FIG. 1 for the purpose of illustration as separated inside enclosure 10, they preferably are positioned adjacent one another so that cam 52 directly actuates switch 48 without any intervening linkage. For example, switch 48 could include a spring-biased button which is directly actuated by cam 52 to open switch 48 whenever thumbwheel 26 reaches a certain angular position inside enclosure 10.

A temperature sensing element 55 is included inside kiln 4 and is connected by conductors 56 to an on-off control unit 57 that is connected in series with the conductors connecting voltage source 15 to controller 12. Whenever the temperature sensing element 55 detects that a sufficient temperature has been reached inside kiln 4 to complete proper firing of the ceramic ware, it activates control unit 57 through conductors 56 to disconnect controller 12 from power source 15. Kiln 4 will then slowly cool down to ambient temperature. Sensing element 55 and control unit 57 may comprise a Dawson kiln sitter or its equivalent.

In the operation of the automatic heat control unit 2, first power controller 12 is energized by either a 110 or 220 volt power source 15 for supplying current to heating elements 6. Thumbwheel 26 is initially rotated to a zero position, as indicated by the indicia on wheel portion 28, where adjusting shaft 18 is so positioned that the on interval of controller 12 has its minimum duration. As power is applied to second controller 36 through limit switch 48, controller 36 will intermittently energize motor 20 in accordance with whatever duration of on interval has been selected by the rotation of adjusting shaft 42. Thus, motor 20 intermittently rotates adjusting shaft 18 through thumbwheel 26 such that the duration of the on interval of controller 12 is intermittently increased while the duration of the off interval is intermittently decreased to provide a time proportional increase in the amount of electric current applied by controller 12 to heating elements 6 to slowly increase the temperature in kiln 4. Finally, when motor 20 has rotated shaft 18 to its maximum position where the duration of the on interval in controller 12 is continuous, cam 52 is so positioned to energize limit switch 48 thereby stopping the flow of power to the first controller 36 and stopping further rotation of motor 20. Therefore, automatic heat control unit 2 will be at its maximum full on position only after a predetermined time period during which shaft 18 is slowly and intermittently rotated by motor 20.

After controller 12 has operated a sufficient length of time in its full on position to increase the temperature in kiln 4 and the ceramic objects therein are properly fired, temperature sensing element 55 disconnects power supply 15 from controller 12. When kiln 4 has cooled down sufficiently to allow safe handling of the products therein, the operator may remove the ceramic ware from kiln 4 and rest control unit 2 for another cycle of operation by rotating thumbwheel 26 back to its zero position. As compared to other kiln heat control units, control unit 2 of the present invention has an extremely low cost because it utilizes elements, such as time proportional power control units 12 and 36, which are extremely inexpensive and readily available. Control unit 2 does not utilize expensive variable reostats to gradually increase the current applied to the heating elements 6, but rather merely applies a constant current to the heating elements through power controller 12 and only adjusts the proportion of the on time versus the off time.

The rate at which the temperature is increased in kiln 4 can be varied within wide limits by adjusting the average speed of rotation of motor 20. Although motor 20 is not a variable speed motor which is more expensive than the constant speed motor 20 used herein, its average speed can still be varied by adjusting the duration of the on interval relative to the off interval in second controller 36. Thus, by manually rotating shaft 42, which suitably protrudes through enclosure 10, so that the duration of the on interval in controller 36 increases, the average speed of rotation of motor 20 will increase thereby increasing the rotation of shaft 18 and causing a faster rise in temperature in kiln 4. Conversely, by rotating shaft 42 to decrease the duration of the on interval in controller 36, the average speed of rotation of motor 20 will decrease thereby causing a slower rate of temperature increase in kiln 4. In addition, the operator may override motor 20 to turn the heating level of control unit 2 up or down by manually rotating thumbwheel 26 in one direction or the other.

Figure 2:
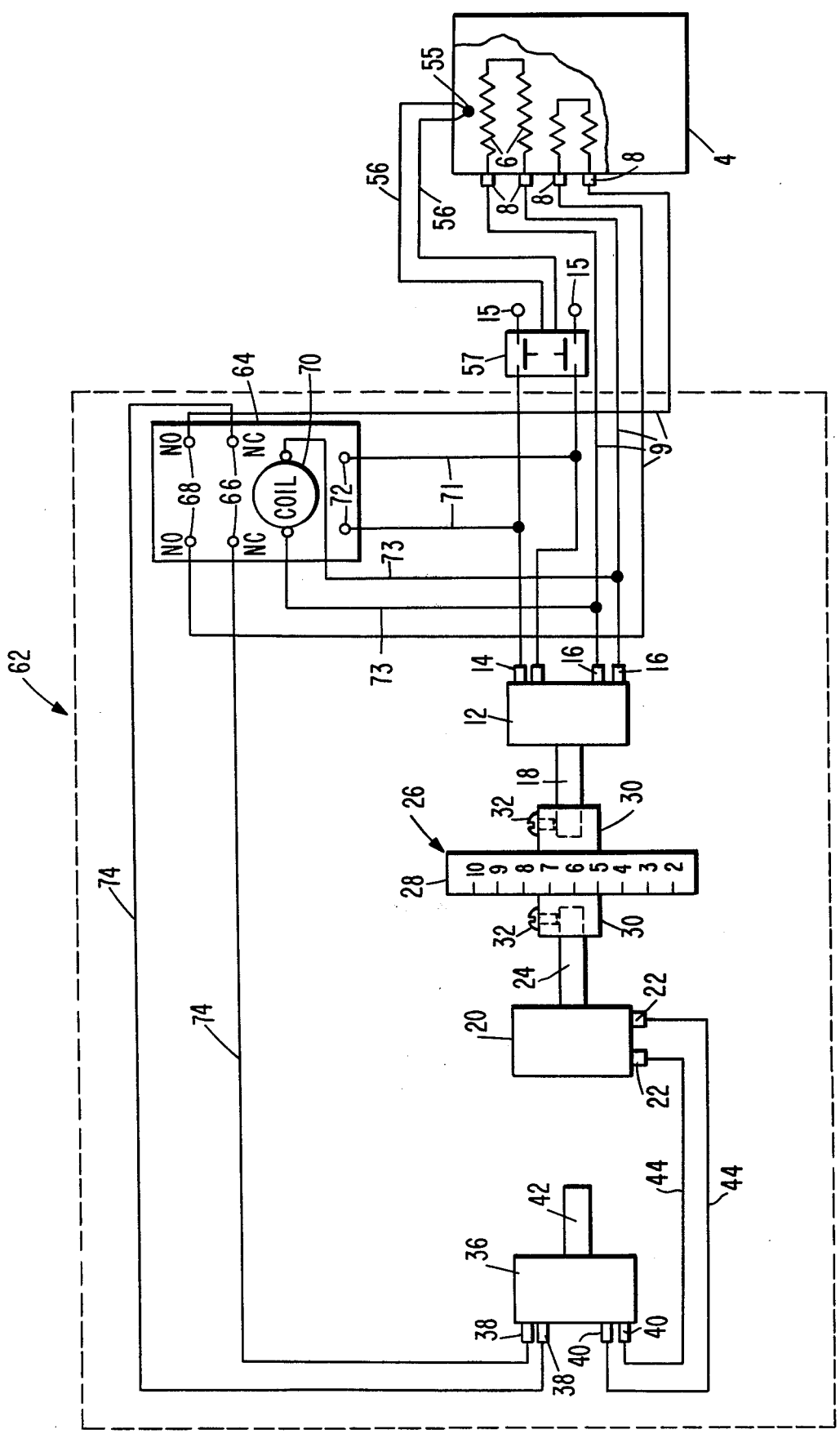
FIG. 2 is a diagrammatic view of a second embodiment of an automatic heat control apparatus according to the present invention.

Referring now to FIG. 2, a second embodiment 62 of an automatic heat control unit according to the present invention is diagrammatically illustrated with similar reference numerals being applied to elements in unit 62 which are identical to corresponding elements in control unit 2. Generally, control unit 62 comprises all the elements of control unit 2 except that the mechanically actuated limit switch 48 for controlling the power input to second power controller 36 has been replaced by an electric relay switch 64 having a set of normally closed contacts 66 and a set of normally open contacts 68. In addition, relay 64 has a coil 70 and an auxiliary pair of terminals 72 for connection to voltage source 15 by conductors 71. Coil 70 is connected by conductors 73 to the output terminals 16 of first power controller 12. Coil 70 will therefore be intermittently energized when controller 12 is intermittently energized during its on interval.

Input terminals 38 of second controller 36 are connected by conductors 74 to the normally closed contacts 66 of relay 64. When controller 12 is in an on interval thereby energizing coil 70 through conductors 73, normally closed contacts 66 supplying the electrical power to controller 36 will be opened thereby disabling controller 36 from energizing motor 20. When controller 12 has reached a full on position so that coil 70 is continuously energized, then normally closed contacts 66 will be continuously opened thereby continuously disabling motor 20 from running in the same manner as limit switch 48. In addition, normally open contacts 68 in relay 64 can be connected to additional heating elements 6 inside kiln 4 via conductors 9 if it is desired to supply additional electric power from the two auxiliary terminals 72 in relay 64. Contacts 68 would be used whenever the amperage requirements of elements 6 exceed the capacity of controller 12 by itself which is approximately 15 amps. However, contacts 68 are still controlled by controller 12 since they will be closed only whenever coil 70 is energized by controller 12 during its on interval. Relay 64 may be a Potter and Brumfield Model No. PR11AYO relay or its equivalent.

Although second controller 36 is shown in FIG. 1 as being energized from power source 50, it could be energized through a feedback relationship with first controller 12. In such an event, conductors 49 would be connected to output terminals 16 of controller 12. Current would thus be applied to controller 36 during the on intervals of controller 12 which are at a minimum when control unit 2 is first turned on and continually increase until they are of constant duration. Thus, the amount of current delivered by controller 36 to motor 20 will be gradually increased over time so that motor 20 has a minimum average speed when unit 2 has just started and kiln 4 is cold and a maximum average speed only after kiln 4 has been heated to some degree. Such an arrangement further lessens the risk of breaking the ceramic material being fired in kiln 4. Control unit 62 shown in FIG. 2 also illustrates a feedback relationship between controllers 12 and 36 through relay 64. However, relay 64 causes current to be applied to controller 36 in an inverse manner to that just described, i.e., average speed of motor 20 will be greatest when unit 62 is first turned on and the intervals of controller 12 are of minimum duration. Although such a feedback arrangement is not quite as advantageous as the former alternative described for control unit 2, the conftrol unit 62 will still give good results in controlling the heating of kiln 4.

Although the present invention has been illustrated in terms of two preferred embodiments, it will be obvious to one of ordinary skill in the art that numerous modifications may be made without departing from the true spirit and scope of the invention. For example, controller 12 and/or controller 36 may have a pilot light connected in parallel with the input terminals thereof to visually indicate that power is being supplied to the heat control unit. However, such pilot lights are not necessary to the present invention whose scope, therefore, is to be limited only by the appended claims.

I claim:

1. An automatic heat control apparatus for use with an electric heating element, comprising:

a power controller having a plurality of timing cycles, each of said timing cycles comprising an on interval during which said controller supplies electric current to said heating element and an off interval during which said controller supplies no current to said heating element, said controller further having a means for adjusting the duration of said on interval relative to said off interval, said adjusting means including a thermomechanical timing mechanism thermally responsive to any fluctuations of electric current and voltage applied to said heating element and thermally sensitive to changes in the ambient temperature of the environment of said heating element; and motor means directly mechanically connected to said adjusting means for automatically, mechanically regulating said adjusting means over a predetermined time period to gradually increase the duration of said on interval and decrease the duration of said off interval to control the rate of temperature increase produced by said heating element, said motor means being the sole means for automatically regulating said adjusting means.

2. An apparatus according to claim 1, wherein said motor means is mechanically connected to said adjusting means.

3. An apparatus according to claim 2, further including means to manually override said motor means.

4. An apparatus according to claim 1, wherein said motor means comprises an electric motor having a rotatable output shaft, and said adjusting means comprises a rotatable adjusting shaft extending outwardly from said controller, and further including a mechanical connection coupling said output and adjusting shafts for joint rotation thereof.

5. An apparatus according to claim 4, wherein said mechanical connection comprises a thumbwheel having two hollow sleeves extending respectively from opposite sides thereof, said output and adjusting shafts each being received in and secured to one of said sleeves.

6. An apparatus according to claim 5, wherein said thumbwheel is adapted to be manually rotated to override said electric motor.

7. An apparatus according to claim 1, wherein said motor means comprises a motor having a selectively variable average speed.

8. An apparatus according to claim 7, wherein said motor means comprises a constant speed electric motor, and further including a second power controller having a plurality of driving cycles, each of said driving cycles comprising an on interval during which said second controller supplies a driving current from a voltage source to said motor and an off interval during which said second controller supplies no driving current to said motor, and means for selectively adjusting the duration of the on interval of said second controller relative to the off interval thereof to vary the average speed of said motor.

9. An apparatus according to claim 8, further including means for uncoupling said second controller from said voltage source when said on interval of said first mentioned controller is of continuous duration.

10. An apparatus according to claim 9, wherein said uncoupling means comprises a mechanically actuated limit switch interposed between said second controller and said voltage source.

11. An apparatus according to claim 9, wherein said uncoupling means comprises an electrical relay connected between said second controller and said voltage source.

12. An automatic heat control apparatus for use with an electric heating element, comprising:

a first power controller having a plurality of timing cycles, each of said timing cycles comprising an on interval during which said first controller supplies electric current to said heating element and an off interval during which said first controller supplies no current to said heating element, said first controller further having a means for adjusting the duration of said on interval relative to said off interval;

motor means comprising a constant speed electric motor having a selectively variable average speed and being operatively connected to said adjusting means for automatically regulating said adjusting means over a predetermined time period to gradually increase the duration of said on interval and decrease the duration of said off interval to control the rate of temperature increase produced by said heating element;

a second power controller having a plurality of driving cycles, each of said driving cycles comprising an on interval during which said second controller supplies a driving current from a voltage source to said motor and an off interval during which said second controller supplies no driving current to said motor, said second controller being connected in a feedback relationship with said first controller such that current is supplied to said second controller in a time varying manner responsive to said first controller; and means for selectively adjusting the duration of the on interval of said second controller relative to the off interval thereof to vary the average speed of said motor.

13. An apparatus according to claim 12, wherein said second controller is supplied with current during the said on intervals of said first controller.

* * * * *